United States Patent [19]

Browne-Wilkinson

[11] Patent Number: 5,607,311
[45] Date of Patent: Mar. 4, 1997

[54] ORTHOPAEDIC HUMAN SKELETAL DEMONSTRATION AIDS

[76] Inventor: Oliver Browne-Wilkinson, 1A Highlands Avenue, Acton, London. W3 6ES, England

[21] Appl. No.: 546,267

[22] Filed: Oct. 20, 1995

[30] Foreign Application Priority Data

Oct. 24, 1994 [GB] United Kingdom ............... 9421362

[51] Int. Cl.⁶ .................................................. G09B 23/38
[52] U.S. Cl. .......................... 434/274; 446/89; 446/390
[58] Field of Search ........................... 434/274, 275; 623/39, 59; 446/381, 371, 390, 375, 296, 89

[56] References Cited

U.S. PATENT DOCUMENTS

| 278,420 | 5/1883 | Eldridge | 446/304 |
|---|---|---|---|
| 2,472,819 | 6/1949 | Giesen | 434/274 |
| 2,644,272 | 7/1953 | Cohn | 446/390 |
| 2,804,721 | 9/1957 | Cohn | 446/381 |
| 2,995,833 | 8/1961 | Bezark | 434/274 |
| 4,106,219 | 8/1978 | Schneider et al. | 434/274 |
| 4,200,995 | 5/1980 | Trella | 434/274 |
| 4,433,961 | 2/1984 | Chandler | 434/274 |
| 4,734,039 | 3/1988 | Thompson | 434/274 |
| 4,838,795 | 6/1989 | Draenert | 434/274 |
| 4,850,877 | 7/1989 | Mason et al. | 434/274 |

FOREIGN PATENT DOCUMENTS 2264190  8/1993  United Kingdom .

*Primary Examiner*—Paul J. Hirsch
*Attorney, Agent, or Firm*—Young & Thompson

[57] ABSTRACT

An orthopaedic human skeletal bone demonstration aid for demonstrating surgical orthopaedic techniques comprises a facsimile human skeletal bone having two joint portions and interconnected by an elongate hollow shaft. The facsimile bone comprises two separable component parts, each consisting of one of the joint portions and a portion of the shaft, which are detachably connected together by a projection on one part engaging within a receiving recess in the other part in such a manner as to provide intercommunication between canal portions within the parts. Such a demonstration aid can be produced by moulding in a straightforward manner, and has the advantage that, if only one of the component parts has been damaged or destroyed in demonstrating a particular surgical technique, only that part of the aid requires replacing in order to enable the aid to be re-used.

8 Claims, 2 Drawing Sheets

ORTHOPAEDIC HUMAN SKELETAL DEMONSTRATION AIDS

BACKGROUND OF THE INVENTION

In the medical field it is known to provide orthopaedic human skeletal bone demonstration aids specifically for the purpose of demonstrating surgical techniques thereon, since it is impractical to rely solely on the demonstration of such techniques on the human body. Such a demonstration aid may consist of a facsimile human skeletal bone, such as a femur or tibia, which mimics as far as possible the natural anatomical form of the bone so as to be capable of demonstrating each stage of surgical alteration made to the bone in the orthopaedic technique to be demonstrated, including the cutting of the bone and the fitting of an orthopaedic prosthesis thereto.

However, in order to be able to mimic the natural anatomical form of many types of bone, the facsimile bone must be hollow, and it is difficult to produce such a hollow structure by conventional techniques. Furthermore the orthopaedic techniques to be demonstrated by use of the aid will generally result in at least partial destruction of the aid rendering the aid unusable for further demonstration purposes, so that an entirely new aid will be required for each demonstration.

It is an object of the invention to provide an improved orthopaedic human skeletal bone demonstration aid which is particularly convenient in use.

SUMMARY OF THE INVENTION

According to the present invention there is provided an orthopaedic human skeletal demonstration aid for demonstrating surgical orthopaedic techniques, the aid comprising a facsimile human skeletal bone having two joint portions at opposite ends thereof and an elongate hollow shaft interconnecting the joint portions, wherein the facsimile human skeletal bone comprises two separable component parts each consisting of a respective one of the joint portions and a respective portion of the shaft and detachably connected together by a projection on one component part engaging within a recess in the other component part in such a manner as to provide intercommunication between canal portions within the two component parts.

Such a demonstration aid is particularly convenient in use in so much as it reproduces the natural anatomical form of the corresponding human bone, including the hollow structure of the bone, for the purpose of demonstrating a wide range of human skeletal bone replacement or repair techniques, including techniques which require passage of an instrument along the bone canal. Furthermore the fact that the demonstration aid is formed in two pans means that, if only one part has been destroyed in a demonstration process, that part of the aid alone requires replacement by a new part, rather than the whole of the aid requiting to be replaced, in order to be usable for a further demonstration. This will generally render the demonstration less costly to perform as it will be less costly to replace only part of the aid rather than the whole of the aid. From a manufacturing point of view, it is also easier to form the canal when the demonstration aid is produced in two parts.

BRIEF DESCRIPTION OF THE DRAWINGS

In order that the invention may be more fully understood, reference will now be made, by way of example, to the accompanying drawings, in which.

DETAILED DESCRIPTION OF THE DRAWINGS

Figure 1:
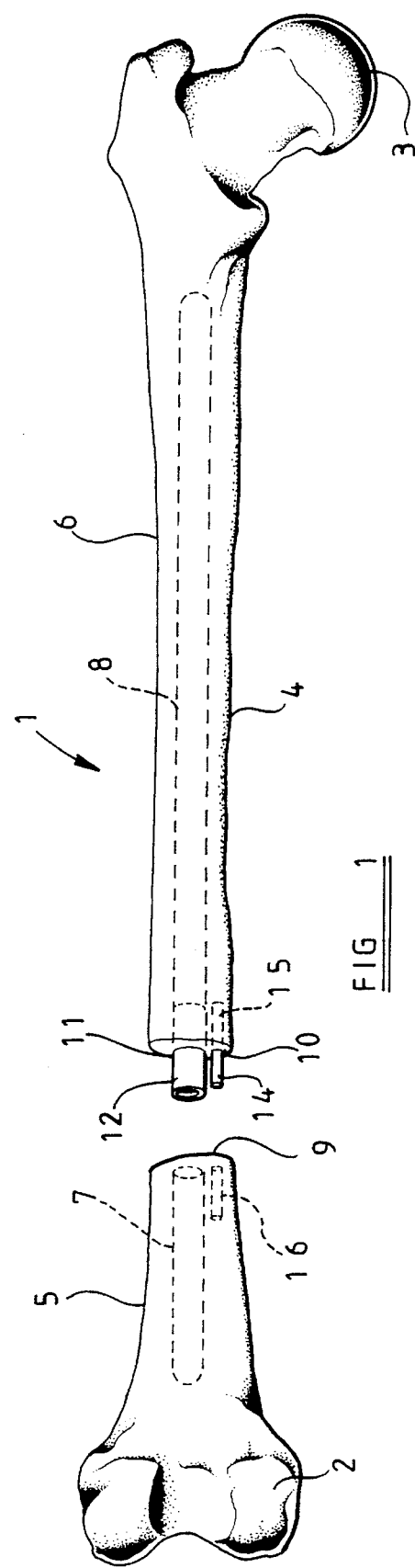
FIGS. 1 and 2 are side views of a first embodiment of demonstration aid in accordance with the invention, respectively in a disconnected condition and in a connected condition.
Figure 2:
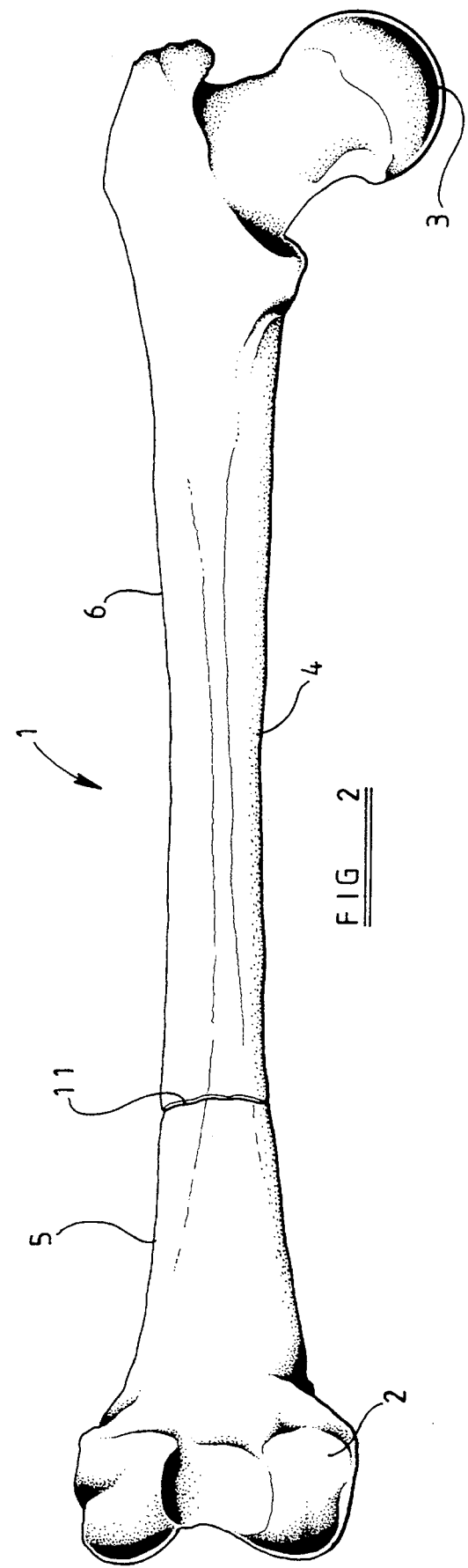

FIGS. 1 and 2 show an orthopaedic human skeletal demonstration aid 1 in the form of a femur (thigh bone) comprising two joint portions 2 and 3 interconnected by an elongate hollow shaft 4. The demonstration aid 1 is made in two parts 5 and 6 moulded from a synthetic material which is capable of replicating the fine structure of the bone surface in a per se known manner. Each of the two parts 5 and 6 is formed with a respective canal portion 7 or 8 of substantially the same cross-sectional diameter, as shown in broken lines in FIG. 1.

Furthermore the two parts 5 and 6 are capable of being joined together by abutment of their joining surfaces 9 and 10 along a joining plane 11 extending substantially perpendicularly to the longitudinal axis of the shaft 4, as shown in FIG. 2, such that the parts 5 and 6 are held together as a friction fit with the required relative orientation about the longitudinal axis so as to reproduce the form of the complete bone. To establish such a connection between the parts 5 and 6, a hollow plastics tube 11 is inserted within the end of the canal portion 8 in the part 6 and is bonded therein so as to provide a hollow projection 12 projecting from the joining surface 10 and detachably receivable within the end of the canal portion 7 in the other part 5. In addition a metal locating pin 14 is bonded within a recess 15 in the part 6 and is detachably receivable within a corresponding locating aperture 16 in the other part 5. Thus, when the two parts 5 and 6 are connected together, the projection 12 and the pin 14 cooperate to ensure that the two parts 5 and 6 are held together as a friction fit with the correct orientation. Furthermore the hollow projection 12 provides intercommunication between the canal portions 7 and 8 within the two parts 5 and 6, so as to permit an instrument to be passed along the canal during use of the demonstration aid to demonstrate a particular surgical technique.

Such a demonstration aid can be produced so as not only to accurately reproduce the appearance of the bone when the parts 5 and 6 are connected together but also so as to as far as possible reproduce the internal structure of the bone, so that a surgical technique carried out on the demonstration aid will mimic as far as possible the same technique carded out on an actual bone within the human body. Furthermore, when one of the parts 5 and 6 has been damaged or destroyed in demonstrating a surgical technique leaving the other part undamaged, the damaged part may be removed and replaced by a new, identical part in order to enable the demonstration aid to be re-used.

The facsimile femur shown in FIGS. 1 and 2 may optionally form part of a demonstration aid comprising a facsimile of the human skeletal femur and tibia, excluding patella, connected together by a plurality of facsimile ligaments in the correct anatomical position. In this case the tibia will usually also be formed in two parts in the manner described above so that the demonstration aid as a whole will comprise a number of parts which are each capable of being separately replaced after the demonstration has been used to demonstrate a particular surgical technique.

Figure 3:
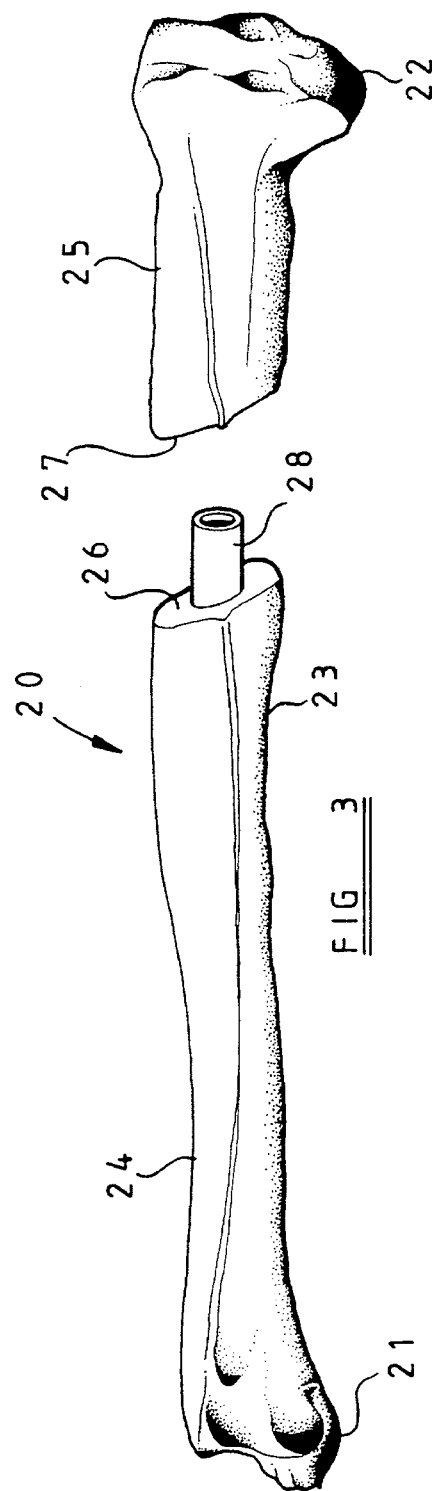
FIGS. 3 and 4 are side views of a second embodiment of demonstration aid in accordance with the invention, respectively in a disconnected condition and in a connected condition.
Figure 4:
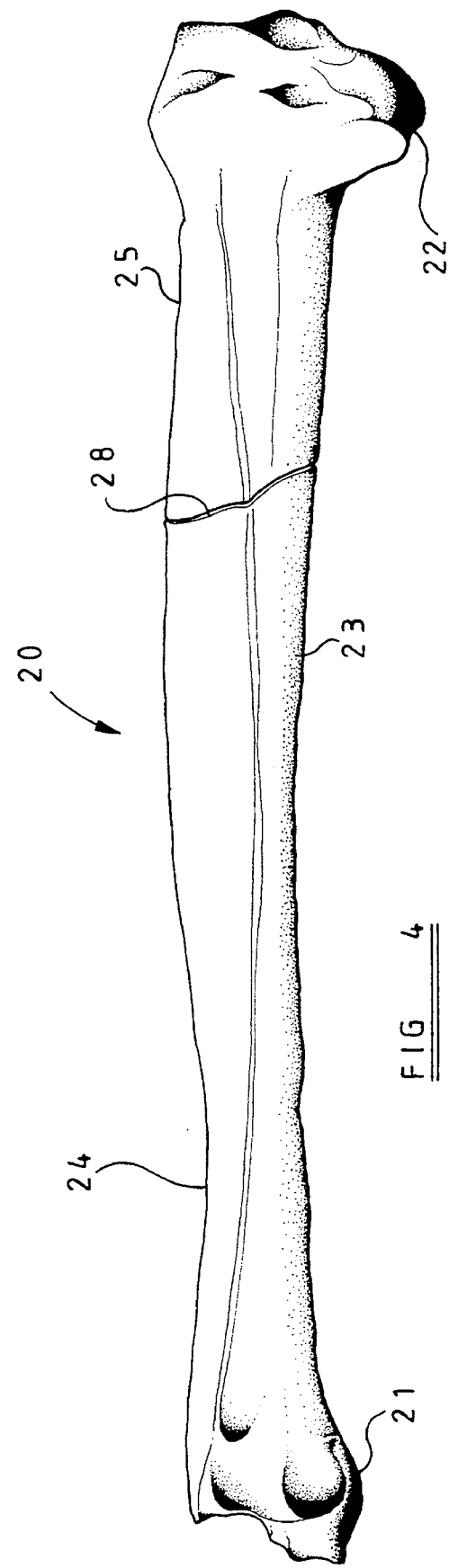

FIGS. 3 and 4 show an alternative demonstration aid 20 in the form of a facsimile tibia comprising two joint portions 21 and 22 interconnected by an elongate hollow shaft 23. As before, the facsimile bone has two component parts 24 and 25 having joining surfaces 26 and 27 which are placed in abutment along a joining plane 28, as shown in FIG. 4, when the parts 24 and 25 are connected together as a friction fit. In this embodiment the parts 24 and 25 are again formed with canal portions (not shown) as before and are connected together by a hollow projection 28 fitted within one end of the canal portion within the part 24 detachably engaging within the end of the canal portion in the other part 25. However, in this case, the correct relative orientation of the parts 24 and 25 is provided by the fact that the joining plane 28 is inclined at a non-perpendicular angle to the longitudinal axis of the shaft 23, rather than a separate locating pin (or locating part of the projection 28) being provided. When the inclined joining surfaces 26 and 27 are placed in abutment the parts 24 and 25 will be at the correct orientation relative to one another.

Other facsimile bones may be provided within the scope of the invention, such as facsimile humerus, radius or ulna, and various demonstration aids in accordance with the invention may be used to demonstrate surgical orthopaedic techniques in joint replacement, such as in the knee, vertebral column, hip, shoulder, digit, wrist, elbow, ankle and the like, as well as in the demonstration of the use of power surgical tools and hand instruments.

What is claimed is:

1. An orthopaedic human skeletal demonstration aid for demonstrating surgical orthopaedic techniques, the aid comprising a facsimile human skeletal bone having two joint portions at opposite ends thereof and an elongate hollow shaft interconnecting the joint portions and having a canal extending therealong, wherein the facsimile human skeletal bone comprises two separable component parts which correspond to parts which are integral with one another in the human skeletal bone mimicked, each of the component parts consisting of a respective one of the joint portions and a respective portion of the shaft, said shaft portion of one of the component parts being provided with a projection and said shaft portion of the other component part being provided with a recess for receiving said projection, whereby the component parts are detachably connectible together by the projection on said one component part engaging within the receiving recess in said other component part in such a manner as to provide intercommunication between the canal portions within the two component parts.

2. An aid according to claim 1, wherein the two component parts are adapted to be connected together with a predetermined relative orientation about a longitudinal axis of the shaft.

3. An aid according to claim 2, wherein said one or other component part has a locating pin for engagement within a locating aperture in said other or one component part so as to provide, together with the projection engaging within the receiving recess, said predetermined relative orientation about the longitudinal axis of the shaft.

4. An aid according to claim 2, wherein said one component part has an inclined joining surface from which the projection projects and said other component part has a complementary inclined joining surface through which the receiving recess extends such that the two joining surfaces meet along a plane which is inclined at a non-perpendicular angle to the longitudinal axis of the shaft when the component parts are connected together with said predetermined relative orientation.

5. An aid according to claim 1, wherein the projection has an axial passage extending therethrough in order to provide intercommunication between the two canal portions within the component parts.

6. An aid according to claim 5, wherein the canal portions within the component parts are of substantially the same cross-sectional diameter, and the projection is defined by a hollow tube fixed within an open end of the canal portion in one component part and detachably engageable within an open end of the canal portion in the other component part.

7. An aid according to claim 1, wherein the facsimile human skeletal bone is coupled to a further facsimile human skeletal bone by facsimile ligaments.

8. An aid according to claim 1, wherein the facsimile human skeletal bone is a facsimile of a femur, tibia, humerus, radius or ulna.

\* \* \* \* \*